(12) United States Patent
Livshiz et al.

(10) Patent No.: US 9,534,547 B2
(45) Date of Patent: Jan. 3, 2017

(54) AIRFLOW CONTROL SYSTEMS AND METHODS

(71) Applicant: GM GLOBAL TECHNOLOGY OPERATIONS LLC, Detroit, MI (US)

(72) Inventors: Michael Livshiz, Ann Arbor, MI (US); Jeffrey M. Kaiser, Highland, MI (US); Christopher E. Whitney, Commerce, MI (US); Gerald J. Hysko, Jr., Grand Blanc, MI (US); David A. White, Grand Blanc, MI (US); B. Jerry Song, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1035 days.

(21) Appl. No.: 13/686,069

(22) Filed: Nov. 27, 2012

(65) Prior Publication Data
US 2014/0076279 A1    Mar. 20, 2014

Related U.S. Application Data

(60) Provisional application No. 61/702,430, filed on Sep. 18, 2012.

(51) Int. Cl.
| | | |
|---|---|---|
| F02D 41/00 | (2006.01) | |
| F02D 13/02 | (2006.01) | |
| F02D 41/14 | (2006.01) | |

(52) U.S. Cl.
CPC ....... F02D 41/0002 (2013.01); F02D 13/0219 (2013.01); F02D 41/0007 (2013.01);
(Continued)

(58) Field of Classification Search
CPC  F02D 41/0002; F02D 41/0007; F02D 41/005; F02D 41/1497; F02D 2041/001; F02D 2041/0017; F02D 2041/002; F02D 2041/1431; F02D 2041/1432; F02D 11/105; F02D 13/0219; F02D 2250/18; F02M 25/0707
See application file for complete search history.

(56) References Cited

U.S. PATENT DOCUMENTS

| | | | |
|---|---|---|---|
| 4,161,929 | A | 7/1979 | Nohira et al. |
| 5,070,846 | A | 12/1991 | Dudek et al. |
| (Continued) | | | |

FOREIGN PATENT DOCUMENTS

| | | |
|---|---|---|
| CN | 1594846 A | 3/2005 |
| WO | WO-03-065135 A1 | 8/2003 |

OTHER PUBLICATIONS

U.S. Appl. No. 14/225,492, filed Mar. 26, 2014, Wong et al.
(Continued)

Primary Examiner — Mahmoud Gimie
Assistant Examiner — John Zaleskas

(57) ABSTRACT

An engine control system for a vehicle, includes a delay and rate limit module, a throttle control module, a phaser control module, and an exhaust gas recirculation (EGR) control module. The delay and rate limit module applies a delay and a rate limit to a first torque request to produce a second torque request. The throttle control module determines a target throttle opening based on the second torque request and selectively adjusts a throttle valve based on the target throttle opening. The phaser control module determines target intake and exhaust phasing values based on the second torque request and selectively adjusts intake and exhaust valve phasers based on the target intake and exhaust phasing values, respectively. The EGR control module determines a target EGR opening based on the first torque request and selectively adjusts an EGR valve based on the target EGR opening.

18 Claims, 5 Drawing Sheets

(52) U.S. Cl.
CPC .... *F02D 41/1497* (2013.01); *F02D 2041/001* (2013.01); *F02D 2041/0017* (2013.01); *F02D 2041/1431* (2013.01); *F02D 2041/1432* (2013.01); *F02D 2250/18* (2013.01); *F02M 26/05* (2016.02); *Y02T 10/144* (2013.01); *Y02T 10/18* (2013.01); *Y02T 10/42* (2013.01)

(56) References Cited

U.S. PATENT DOCUMENTS

| | | | |
|---|---|---|---|
| 5,101,786 A * | 4/1992 | Kamio | B60W 10/06 123/399 |
| 5,293,553 A | 3/1994 | Dudek et al. | |
| 5,706,780 A | 1/1998 | Shirakawa | |
| 5,727,528 A * | 3/1998 | Hori | F02D 41/0072 123/486 |
| 5,775,293 A * | 7/1998 | Kresse | F02D 11/105 123/396 |
| 5,921,219 A | 7/1999 | Frohlich et al. | |
| 6,014,955 A * | 1/2000 | Hosotani | F02D 41/0002 123/399 |
| 6,155,230 A * | 12/2000 | Iwano | F02D 11/105 123/339.16 |
| 6,532,935 B2 * | 3/2003 | Ganser | F02D 11/105 123/406.29 |
| 6,606,981 B2 | 8/2003 | Itoyama | |
| 6,704,638 B2 | 3/2004 | Livshiz et al. | |
| 6,714,852 B1 | 3/2004 | Lorenz et al. | |
| 6,826,904 B2 | 12/2004 | Miura | |
| 6,840,215 B1 | 1/2005 | Livshiz et al. | |
| 6,985,809 B2 | 1/2006 | Yasui | |
| 7,016,779 B2 | 3/2006 | Bowyer | |
| 7,021,282 B1 | 4/2006 | Livshiz et al. | |
| 7,051,058 B2 * | 5/2006 | Wagner | F02D 11/105 123/396 |
| 7,076,953 B2 | 7/2006 | Kreso | |
| 7,274,986 B1 | 9/2007 | Petridis et al. | |
| 7,275,374 B2 | 10/2007 | Stewart et al. | |
| 7,328,577 B2 | 2/2008 | Stewart et al. | |
| 7,395,147 B2 | 7/2008 | Livshiz et al. | |
| 7,400,967 B2 | 7/2008 | Ueno et al. | |
| 7,433,775 B2 | 10/2008 | Livshiz et al. | |
| 7,441,544 B2 | 10/2008 | Hagari | |
| 7,472,692 B2 | 1/2009 | Nakagawa et al. | |
| 7,614,384 B2 | 11/2009 | Livshiz et al. | |
| 7,650,225 B2 | 1/2010 | Nakagawa et al. | |
| 7,703,439 B2 * | 4/2010 | Russell | F02D 13/02 123/406.23 |
| 7,715,975 B2 | 5/2010 | Yamaoka et al. | |
| 7,775,195 B2 | 8/2010 | Schondorf et al. | |
| 7,783,409 B2 | 8/2010 | Kang et al. | |
| 7,813,869 B2 | 10/2010 | Grichnik et al. | |
| 7,885,756 B2 | 2/2011 | Livshiz et al. | |
| 7,941,260 B2 | 5/2011 | Lee et al. | |
| 7,967,720 B2 | 6/2011 | Martin et al. | |
| 8,041,487 B2 | 10/2011 | Worthing et al. | |
| 8,050,841 B2 | 11/2011 | Costin et al. | |
| 8,073,610 B2 | 12/2011 | Heap et al. | |
| 8,103,425 B2 | 1/2012 | Choi et al. | |
| 8,103,428 B2 | 1/2012 | Russ et al. | |
| 8,116,954 B2 | 2/2012 | Livshiz et al. | |
| 8,176,735 B2 | 5/2012 | Komatsu | |
| 8,255,139 B2 | 8/2012 | Whitney et al. | |
| 8,307,814 B2 | 11/2012 | Leroy et al. | |
| 8,447,492 B2 | 5/2013 | Watanabe et al. | |
| 8,468,821 B2 | 6/2013 | Liu et al. | |
| 8,483,935 B2 | 7/2013 | Whitney et al. | |
| 8,560,204 B2 | 10/2013 | Simon, Jr. et al. | |
| 8,739,766 B2 | 6/2014 | Jentz et al. | |
| 8,862,248 B2 | 10/2014 | Yasui | |
| 8,954,257 B2 | 2/2015 | Livshiz et al. | |
| 9,052,997 B2 | 6/2015 | Ono | |
| 9,062,631 B2 | 6/2015 | Kinugawa et al. | |
| 9,075,406 B2 | 7/2015 | Nakada | |
| 9,127,614 B2 | 9/2015 | Ueno et al. | |
| 9,145,841 B2 | 9/2015 | Miyazaki et al. | |
| 9,175,628 B2 | 11/2015 | Livshiz et al. | |
| 9,243,524 B2 | 1/2016 | Whitney et al. | |
| 2002/0038647 A1 * | 4/2002 | Tashiro | B60W 10/06 123/350 |
| 2002/0078924 A1 | 6/2002 | Yagi | |
| 2002/0128116 A1 * | 9/2002 | Idogawa | F02B 17/005 477/54 |
| 2002/0179050 A1 | 12/2002 | Soliman et al. | |
| 2003/0074892 A1 | 4/2003 | Miura | |
| 2003/0110760 A1 * | 6/2003 | Shirakawa | F01N 3/0842 60/278 |
| 2003/0145836 A1 | 8/2003 | Linna et al. | |
| 2004/0116220 A1 * | 6/2004 | Yamamoto | F16H 59/14 474/18 |
| 2005/0065691 A1 * | 3/2005 | Cho | F02D 11/105 701/54 |
| 2005/0131620 A1 | 6/2005 | Bowyer | |
| 2005/0166900 A1 | 8/2005 | Song et al. | |
| 2005/0171670 A1 * | 8/2005 | Yoshioka | B60W 10/06 701/54 |
| 2005/0193739 A1 | 9/2005 | Brunell et al. | |
| 2005/0267608 A1 | 12/2005 | Nishira et al. | |
| 2006/0137335 A1 | 6/2006 | Stewart et al. | |
| 2006/0199699 A1 | 9/2006 | Berglund et al. | |
| 2007/0068159 A1 | 3/2007 | Ueno et al. | |
| 2007/0174003 A1 | 7/2007 | Ueno et al. | |
| 2008/0127938 A1 | 6/2008 | Hagari | |
| 2008/0271718 A1 | 11/2008 | Schondorf et al. | |
| 2008/0308066 A1 | 12/2008 | Martin et al. | |
| 2009/0018733 A1 | 1/2009 | Livshiz et al. | |
| 2009/0033264 A1 * | 2/2009 | Falkenstein | F02D 11/105 318/432 |
| 2009/0037066 A1 * | 2/2009 | Kuwahara | F02D 41/1497 701/84 |
| 2009/0037073 A1 * | 2/2009 | Jung | F02D 41/102 701/101 |
| 2009/0118968 A1 * | 5/2009 | Livshiz | F02D 11/105 701/102 |
| 2009/0118969 A1 | 5/2009 | Heap et al. | |
| 2009/0118972 A1 * | 5/2009 | Baur | B60K 6/48 701/102 |
| 2009/0143959 A1 | 6/2009 | Yamaoka et al. | |
| 2009/0229562 A1 | 9/2009 | Ramappan et al. | |
| 2009/0292435 A1 | 11/2009 | Costin et al. | |
| 2010/0049419 A1 * | 2/2010 | Yoshikawa | F02D 11/105 701/103 |
| 2010/0057283 A1 | 3/2010 | Worthing et al. | |
| 2010/0057329 A1 | 3/2010 | Livshiz et al. | |
| 2010/0075803 A1 * | 3/2010 | Sharples | B60K 6/48 477/110 |
| 2010/0116249 A1 | 5/2010 | Guerrassi et al. | |
| 2010/0116250 A1 * | 5/2010 | Simon, Jr. | B60L 11/14 123/436 |
| 2010/0180876 A1 | 7/2010 | Leroy et al. | |
| 2010/0211294 A1 * | 8/2010 | Soejima | F02D 11/105 701/108 |
| 2010/0241335 A1 * | 9/2010 | Aso | F02D 41/0002 701/103 |
| 2010/0263627 A1 * | 10/2010 | Whitney | F02D 11/10 123/399 |
| 2010/0268436 A1 | 10/2010 | Soejima et al. | |
| 2010/0280738 A1 * | 11/2010 | Whitney | F02D 11/105 701/102 |
| 2011/0034298 A1 * | 2/2011 | Doering | F02D 41/0002 477/54 |
| 2011/0045948 A1 | 2/2011 | Doering et al. | |
| 2011/0066308 A1 | 3/2011 | Yang et al. | |
| 2011/0082629 A1 * | 4/2011 | Soejima | F02P 5/14 701/54 |
| 2011/0087421 A1 * | 4/2011 | Soejima | F02D 41/0002 701/102 |
| 2011/0100013 A1 | 5/2011 | Whitney et al. | |
| 2011/0113773 A1 | 5/2011 | Liu et al. | |
| 2011/0125390 A1 * | 5/2011 | Bellinger | F02D 41/0215 701/104 |
| 2011/0144838 A1 | 6/2011 | Matthews et al. | |

(56) References Cited

U.S. PATENT DOCUMENTS

| | | |
|---|---|---|
| 2011/0264353 A1 | 10/2011 | Atkinson et al. |
| 2012/0065864 A1 | 3/2012 | Whitney et al. |
| 2012/0150399 A1* | 6/2012 | Kar .............. F02D 11/105 701/54 |
| 2012/0203434 A1 | 8/2012 | Sujan et al. |
| 2013/0032123 A1 | 2/2013 | Kinugawa et al. |
| 2013/0032127 A1 | 2/2013 | Jentz et al. |
| 2013/0060448 A1 | 3/2013 | Nakada |
| 2013/0080023 A1* | 3/2013 | Livshiz ............. F02P 5/1504 701/102 |
| 2013/0104859 A1 | 5/2013 | Miyazaki et al. |
| 2013/0151124 A1 | 6/2013 | Seiberlich et al. |
| 2013/0184961 A1 | 7/2013 | Kumar et al. |
| 2013/0213353 A1 | 8/2013 | Rollinger et al. |
| 2013/0255625 A1* | 10/2013 | Kar ................ F02D 41/1497 123/350 |
| 2014/0076279 A1 | 3/2014 | Livshiz et al. |
| 2014/0123938 A1* | 5/2014 | Whitney .......... F02D 11/105 123/319 |
| 2014/0174413 A1 | 6/2014 | Huang et al. |
| 2014/0174414 A1 | 6/2014 | Huang et al. |
| 2014/0311446 A1* | 10/2014 | Whitney .......... F02D 41/0002 123/344 |
| 2014/0316681 A1* | 10/2014 | Whitney .......... F02D 41/22 701/108 |
| 2014/0316682 A1* | 10/2014 | Whitney .......... F02D 11/105 701/108 |
| 2014/0316683 A1* | 10/2014 | Whitney .......... F02D 11/105 701/108 |
| 2015/0039206 A1 | 2/2015 | Storch et al. |
| 2015/0275569 A1 | 10/2015 | LeBlanc |
| 2015/0275711 A1 | 10/2015 | Whitney et al. |
| 2015/0275771 A1 | 10/2015 | Pochner et al. |
| 2015/0275772 A1 | 10/2015 | Long et al. |
| 2015/0275783 A1 | 10/2015 | Wong et al. |
| 2015/0275784 A1 | 10/2015 | Whitney et al. |
| 2015/0275785 A1 | 10/2015 | Cygan, Jr. et al. |
| 2015/0275786 A1 | 10/2015 | Jin et al. |
| 2015/0275789 A1 | 10/2015 | Cygan, Jr. et al. |
| 2015/0275792 A1 | 10/2015 | Genslak et al. |
| 2015/0275794 A1 | 10/2015 | Verdejo et al. |
| 2015/0275795 A1 | 10/2015 | Cygan, Jr. et al. |
| 2015/0275796 A1 | 10/2015 | Pochner et al. |
| 2015/0275806 A1 | 10/2015 | Genslak et al. |

OTHER PUBLICATIONS

U.S. Appl. No. 14/225,496, filed Mar. 26, 2014, Pochner et al.
U.S. Appl. No. 14/225,502, filed Mar. 26, 2014, Long et al.
U.S. Appl. No. 14/225,507, filed Mar. 26, 2014, Jin et al.
U.S. Appl. No. 14/225,516, filed Mar. 26, 2014, Whitney et al.
U.S. Appl. No. 14/225,531, filed Mar. 26, 2014, Genslak et al.
U.S. Appl. No. 14/225,569, filed Mar. 26, 2014, Long et al.
U.S. Appl. No. 14/225,587, filed Mar. 26, 2014, Cygan Jr. et al.
U.S. Appl. No. 14/225,626, filed Mar. 26, 2014, Verdejo et al.
U.S. Appl. No. 14/225,808, filed Mar. 26, 2014, Whitney et al.
U.S. Appl. No. 14/225,817, filed Mar. 26, 2014, Cygan Jr. et al.
U.S. Appl. No. 14/225,891, filed Mar. 26, 2014, Genslak et al.
U.S. Appl. No. 14/225,896, filed Mar. 26, 2014, Cygan Jr. et al.
U.S. Appl. No. 14/226,006, filed Mar. 26, 2014, Pochner et al.
U.S. Appl. No. 14/226,121, filed Mar. 26, 2014, Wong et al.
U.S. Appl. No. 13/613,588, Livshiz et al.
U.S. Appl. No. 13/613,683, Livshiz et al.
U.S. Appl. No. 14/675,828, filed Apr. 1, 2015, Long et al.
U.S. Appl. No. 14/675,860, filed Apr. 2001, Long et al.
John C. G. Boot; "Quadratic Programming: Algorithms, Anomalies, Applications vol. 2 of Studies in mathematical and managerial economics"; North-Holland Publ.Comp., 1964; 213 pages.
N. Lawrence Ricker; "Use of quadratic programming for constrained internal model control"; Ind. Eng. Chem. Process Des. Dev., 1985, pp. 925-936.
C. E. Lemke; "A Method of Solution for Quadratic Programs"; Rensselaer Polytechnic Institute, Troy, New York, Published Online: Jul. 1, 1962, pp. 442-453.
U.S. Appl. No. 14/309,047, filed Jun. 19, 2014, Jose C. Zavala Jurado et al.
U.S. Appl. No. 14/617,068, filed Feb. 9, 2015, Whitney et al.
U.S. Appl. No. 13/911,121, Whitney et al.
U.S. Appl. No. 13/911,132, Whitney et al.
U.S. Appl. No. 13/911,148, Whitney et al.
U.S. Appl. No. 13/911,156, Whitney et al.
U.S. Appl. No. 14/032,508, Storch et al.
Kolmanovsky, I., "Towards Engine and Powertrain Control Based on Model Predictive Control," (Sep. 28, 2012), Powerpoint Presentation, 47 slides.
U.S. Appl. No. 14/931,134, filed Nov. 3, 2015, Wong et al.

* cited by examiner

AIRFLOW CONTROL SYSTEMS AND METHODS

CROSS-REFERENCE TO RELATED APPLICATIONS

This application claims the benefit of U.S. Provisional Application No. 61/702,430, filed on Sep. 18, 2012. The disclosure of the above application is incorporated herein by reference in its entirety.

This application is related to U.S. patent application Ser. No. 13/613,588, filed on Sep. 13, 2012, and U.S. patent application Ser. No. 13/613,683, filed on Sep. 13, 2012. The entire disclosures of the above applications are incorporated herein by reference.

FIELD

The present disclosure relates to internal combustion engines and more particularly to engine control systems and methods for vehicles.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Air flow into the engine is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders and/or to achieve a desired torque output. Increasing the amount of air and fuel provided to the cylinders increases the torque output of the engine.

In spark-ignition engines, spark initiates combustion of an air/fuel mixture provided to the cylinders. In compression-ignition engines, compression in the cylinders combusts the air/fuel mixture provided to the cylinders. Spark timing and air flow may be the primary mechanisms for adjusting the torque output of spark-ignition engines, while fuel flow may be the primary mechanism for adjusting the torque output of compression-ignition engines.

Engine control systems have been developed to control engine output torque to achieve a desired torque. Traditional engine control systems, however, do not control the engine output torque as accurately as desired. Further, traditional engine control systems do not provide a rapid response to control signals or coordinate engine torque control among various devices that affect the engine output torque.

SUMMARY

An engine control system for a vehicle, includes a delay and rate limit module, a throttle control module, a phaser control module, and an exhaust gas recirculation (EGR) control module. The delay and rate limit module applies a delay and a rate limit to a first torque request to produce a second torque request. The throttle control module determines a target throttle opening based on the second torque request and selectively adjusts a throttle valve based on the target throttle opening. The phaser control module determines target intake and exhaust phasing values based on the second torque request and selectively adjusts intake and exhaust valve phasers based on the target intake and exhaust phasing values, respectively. The EGR control module determines a target EGR opening based on the first torque request and selectively adjusts an EGR valve based on the target EGR opening.

An engine control method for a vehicle, includes: applying a delay and a rate limit to a first torque request to produce a second torque request; determining a target throttle opening based on the second torque request; and selectively adjusting a throttle valve based on the target throttle opening. The engine control method further includes: determining target intake and exhaust phasing values based on the second torque request; selectively adjusting intake and exhaust valve phasers based on the target intake and exhaust phasing values, respectively; determining a target exhaust gas recirculation (EGR) opening based on the first torque request; and selectively adjusting an EGR valve based on the target EGR opening.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

An engine control module (ECM) controls torque output of an engine. More specifically, the ECM controls actuators of the engine based on target values, respectively, to produce a requested amount of torque. For example, the ECM controls intake and exhaust valve phasing based on target intake and exhaust phasing angles, a throttle valve based on a target throttle opening, an exhaust gas recirculation (EGR) valve based on a target EGR opening, and a wastegate of a turbocharger based on a target wastegate duty cycle.

The ECM determines a torque request for controlling intake and exhaust cam phasing, the throttle valve, the EGR valve, and the wastegate. The ECM shapes the torque request into a shaped torque request. The ECM determines a first target torque based on the shaped torque request and a first torque adjustment and determines the target throttle opening and the target wastegate duty cycle based on the first target torque. The ECM also determines a second target torque based on the shaped torque request and a second torque adjustment and determines the target intake and exhaust phasing angles based on the second target torque. The ECM determines a third target torque based on the (non-shaped) torque request and a third torque adjustment and determines the target EGR opening based on the third target torque. In this manner, setting of the first target torque, the second target torque, and the third target torque is coordinated with the response characteristics of the throttle valve 112 and the turbocharger, the intake and exhaust cam phasers 148 and 150, and the EGR valve 170, respectively. The coordination of the target torques with the respective response characteristics may increase engine performance and response.

Figure 1:
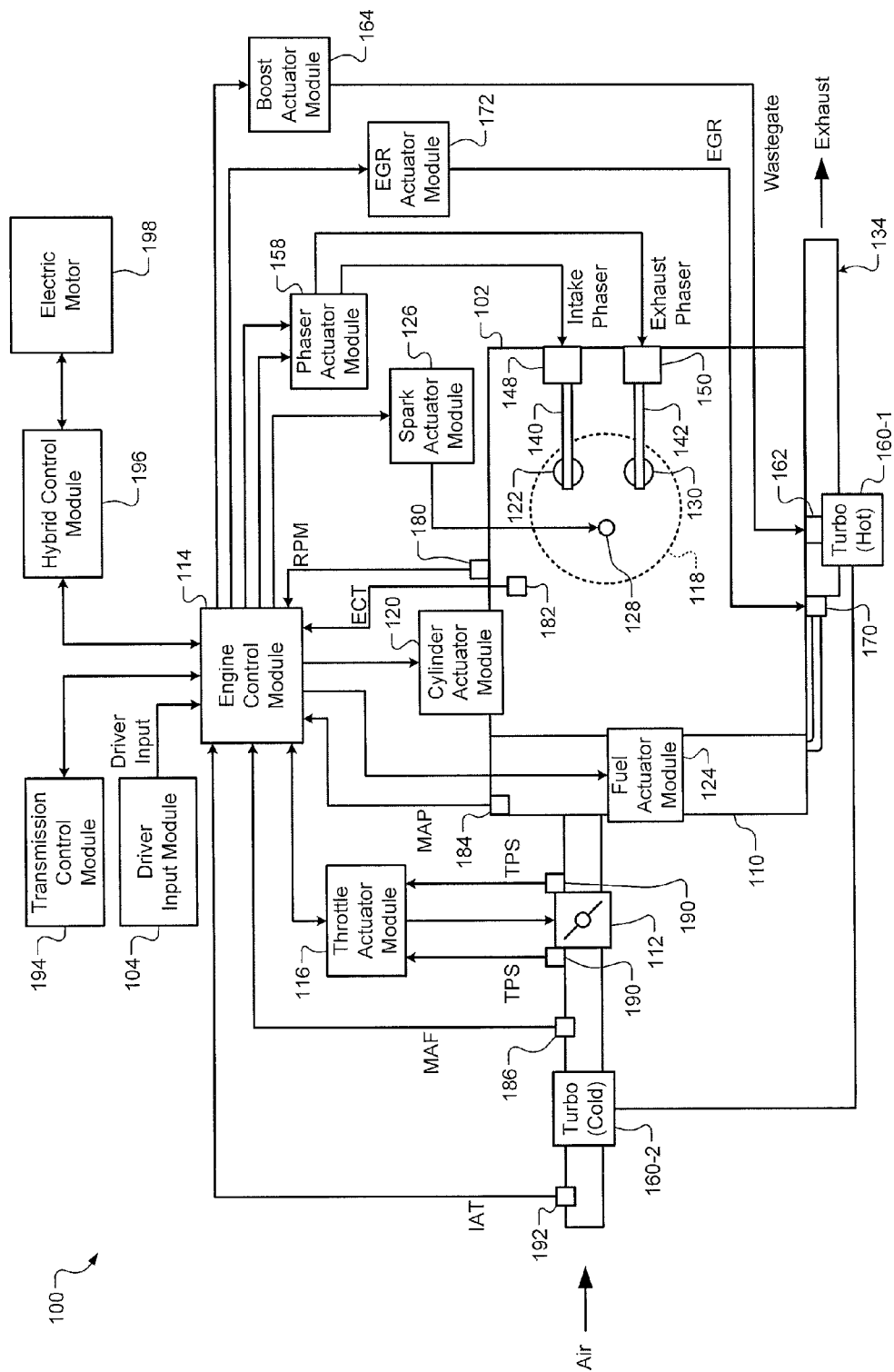
FIG. 1 is a functional block diagram of an example engine system according to the present disclosure.

Referring now to FIG. 1, a functional block diagram of an example engine system 100 is presented. The engine system 100 includes an engine 102 that combusts an air/fuel mixture to produce drive torque for a vehicle based on driver input from a driver input module 104. Air is drawn into an intake manifold 110 through a throttle valve 112. For example only, the throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders, which may improve fuel economy under certain engine operating conditions.

The engine 102 may operate using a four-stroke cycle. The four strokes, described below, may be referred to as the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls a fuel actuator module 124, which regulates fuel injection to achieve a target air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. While not shown, the engine 102 may be a compression-ignition engine, in which case compression within the cylinder 118 ignites the air/fuel mixture. Alternatively, as shown, the engine 102 may be a spark-ignition engine, in which case a spark actuator module 126 energizes a spark plug 128 in the cylinder 118 based on a signal from the ECM 114, which ignites the air/fuel mixture. The timing of the spark may be specified relative to the time when the piston is at its topmost position, referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with crankshaft angle. The spark actuator module 126 may halt provision of spark to deactivated cylinders. Generating spark may be referred to as a firing event. The spark actuator module 126 may have the ability to vary the timing of the spark for each firing event. The spark actuator module 126 may vary the spark timing for a next firing event when the spark timing is changed between a last firing event and the next firing event.

During the combustion stroke, the combustion of the air/fuel mixture drives the piston away from TDC, thereby driving the crankshaft. The combustion stroke may be defined as the time between the piston reaching TDC and the time at which the piston reaches bottom dead center (BDC). During the exhaust stroke, the piston begins moving away from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118). The cylinder actuator module 120 may deactivate the cylinder 118 by disabling opening of the intake valve 122 and/or the exhaust valve 130. In various other implementations, the intake valve 122 and/or the exhaust valve 130 may be controlled by devices other than camshafts, such as camless valve actuators.

The time when the intake valve 122 is opened may be varied with respect to piston TDC by an intake cam phaser 148. The time when the exhaust valve 130 is opened may be varied with respect to piston TDC by an exhaust cam phaser 150. A phaser actuator module 158 may control the intake cam phaser 148 and the exhaust cam phaser 150 based on signals from the ECM 114. When implemented, variable valve lift (not shown) may also be controlled by the phaser actuator module 158.

The engine system 100 may include a boost device that provides pressurized air to the intake manifold 110. For example, FIG. 1 shows a turbocharger including a hot turbine 160-1 that is powered by hot exhaust gases flowing through the exhaust system 134. The turbocharger also includes a cold air compressor 160-2 that is driven by the turbine 160-1. The compressor 160-2 compresses air leading into the throttle valve 112. In various implementations, a supercharger (not shown), driven by the crankshaft, may compress air from the throttle valve 112 and deliver the compressed air to the intake manifold 110.

A wastegate 162 may allow exhaust to bypass the turbine 160-1, thereby reducing the boost (the amount of intake air compression) provided by the turbocharger. The ECM 114 may control the turbocharger via a boost actuator module 164. The boost actuator module 164 may modulate the boost of the turbocharger by controlling opening of the wastegate 162. In various implementations, multiple turbochargers may be controlled by the boost actuator module 164. The turbocharger may have variable geometry, which may be controlled by the boost actuator module 164.

An intercooler (not shown) may dissipate some of the heat contained in the compressed air charge, which is generated as the air is compressed. The compressed air charge may also have absorbed heat from components of the exhaust system 134. Although shown separated for purposes of illustration, the turbine 160-1 and the compressor 160-2 may be attached to each other, placing intake air in close proximity to hot exhaust.

The engine system 100 may include an exhaust gas recirculation (EGR) valve 170, which selectively redirects exhaust gas back to the intake manifold 110. The EGR valve 170 may be located upstream of the turbocharger's turbine 160-1. The EGR valve 170 may be controlled by an EGR actuator module 172.

The engine system 100 may measure the speed of the crankshaft in revolutions per minute (RPM) using an RPM sensor 180. The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. In various implementations, engine vacuum, which is the difference between ambient air pressure and the pressure within the intake manifold 110, may be measured. The mass flow rate of air flowing into the intake manifold 110 may be measured using a mass air flow (MAF) sensor 186. In various implementations, the MAF sensor 186 may be located in a housing that also includes the throttle valve 112.

The throttle actuator module 116 may monitor the position of the throttle valve 112 using one or more throttle position sensors (TPS) 190. The ambient temperature of air being drawn into the engine 102 may be measured using an intake air temperature (IAT) sensor 192. The engine system 100 may also include one or more other sensors. The ECM 114 may use signals from the sensors to make control decisions for the engine system 100.

The ECM 114 may communicate with a transmission control module 194 to coordinate shifting gears in a transmission (not shown). For example, the ECM 114 may reduce engine torque during a gear shift. The ECM 114 may communicate with a hybrid control module 196 to coordinate operation of the engine 102 and an electric motor 198.

The electric motor 198 may also function as a generator, and may be used to produce electrical energy for use by vehicle electrical systems and/or for storage in a battery. In various implementations, various functions of the ECM 114, the transmission control module 194, and the hybrid control module 196 may be integrated into one or more modules.

Each system that varies an engine parameter may be referred to as an actuator. Each system receives a target actuator value. For example, the throttle actuator module 116 may be referred to as an actuator, and a target throttle opening (e.g., area) may be referred to as the target actuator value. In the example of FIG. 1, the throttle actuator module 116 achieves the target throttle opening by adjusting an angle of the blade of the throttle valve 112.

Similarly, the spark actuator module 126 may be referred to as an actuator, while the corresponding target actuator value may be a target spark timing relative to piston TDC. Other actuators may include the cylinder actuator module 120, the fuel actuator module 124, the phaser actuator module 158, the boost actuator module 164, and the EGR actuator module 172. For these actuators, the target actuator values may include target number of activated cylinders, target fueling parameters, target intake and exhaust cam phaser angles, target wastegate duty cycle, and target EGR valve opening area, respectively. The ECM 114 may generate the target actuator values to cause the engine 102 to generate a target engine output torque.

Figure 2:
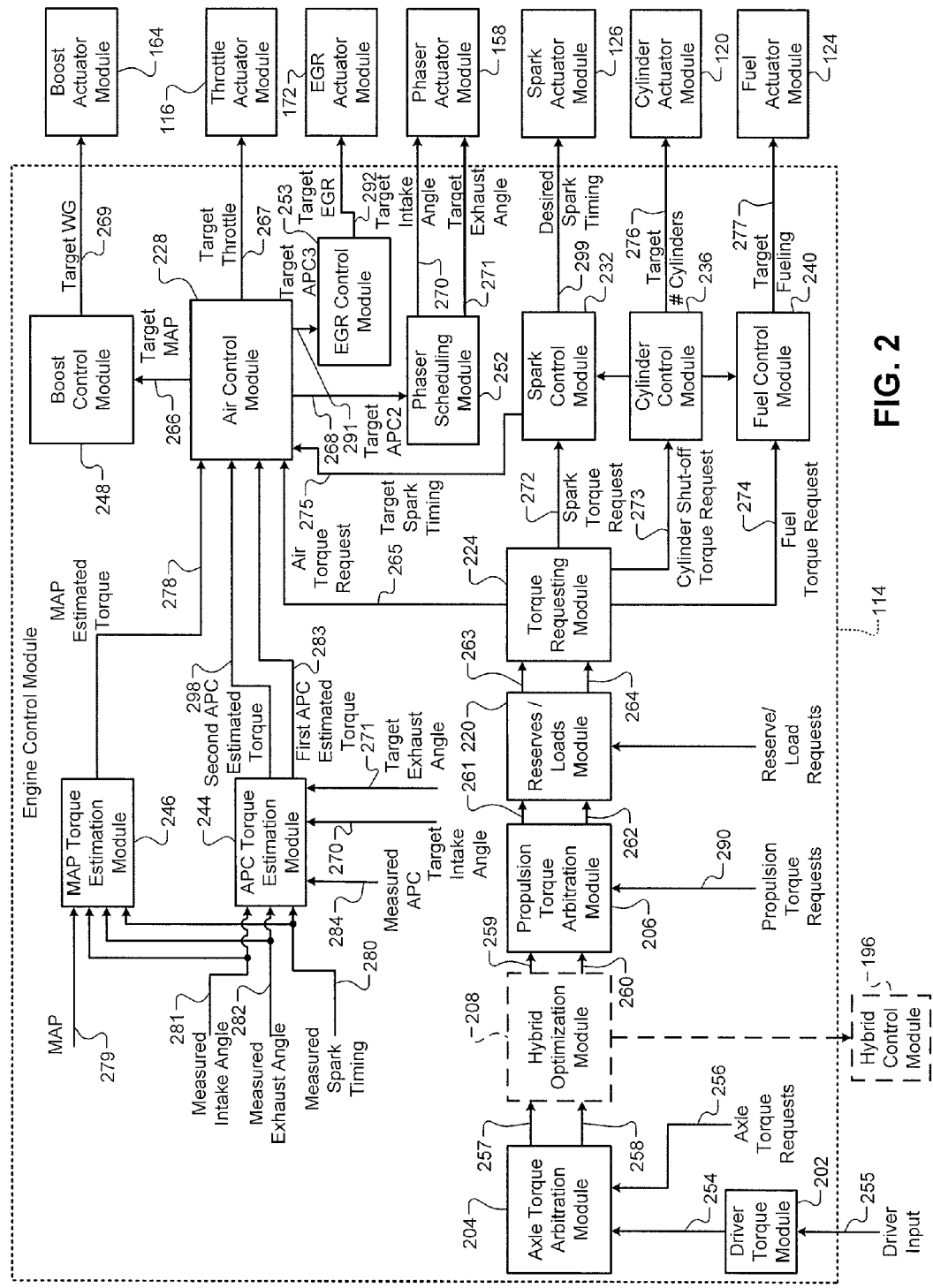
FIG. 2 is a functional block diagram of an example engine control system according to the present disclosure.

Referring now to FIG. 2, a functional block diagram of an example engine control system is presented. An example implementation of the ECM 114 includes a driver torque module 202, an axle torque arbitration module 204, and a propulsion torque arbitration module 206. The ECM 114 may include a hybrid optimization module 208. The ECM 114 also includes a reserves/loads module 220, a torque requesting module 224, an air control module 228, a spark control module 232, a cylinder control module 236, and a fuel control module 240. The ECM 114 also includes an air per cylinder (APC) torque estimation module 244, a MAP torque estimation module 246, a boost control module 248, a phaser control module 252, and an EGR control module 253.

The driver torque module 202 may determine a driver torque request 254 based on a driver input 255 from the driver input module 104. The driver input 255 may be based on, for example, a position of an accelerator pedal and a position of a brake pedal. The driver input 255 may also be based on cruise control, which may be an adaptive cruise control system that varies vehicle speed to maintain a predetermined following distance. The driver torque module 202 may store one or more mappings of accelerator pedal position to target torque and may determine the driver torque request 254 based on a selected one of the mappings.

An axle torque arbitration module 204 arbitrates between the driver torque request 254 and other axle torque requests 256. Axle torque (torque at the wheels) may be produced by various sources including an engine and/or an electric motor. For example, the axle torque requests 256 may include a torque reduction requested by a traction control system when positive wheel slip is detected. Positive wheel slip occurs when axle torque overcomes friction between the wheels and the road surface, and the wheels begin to slip against the road surface. The axle torque requests 256 may also include a torque increase request to counteract negative wheel slip, where a tire of the vehicle slips in the other direction with respect to the road surface because the axle torque is negative.

The axle torque requests 256 may also include brake management requests and vehicle over-speed torque requests. Brake management requests may reduce axle torque to ensure that the axle torque does not exceed the ability of the brakes to hold the vehicle when the vehicle is stopped. Vehicle over-speed torque requests may reduce the axle torque to prevent the vehicle from exceeding a predetermined speed. The axle torque requests 256 may also be generated by vehicle stability control systems.

The axle torque arbitration module 204 outputs a predicted torque request 257 and an immediate torque request 258 based on the results of arbitrating between the received torque requests 254 and 256. As described below, the predicted and immediate torque requests 257 and 258 from the axle torque arbitration module 204 may selectively be adjusted by other modules of the ECM 114 before being used to control the actuators of the engine system 100.

In general terms, the immediate torque request 258 is the amount of currently target axle torque, while the predicted torque request 257 is the amount of axle torque that may be needed on short notice. The ECM 114 controls the engine system 100 to produce an axle torque equal to the immediate torque request 258. However, different combinations of actuator values may result in the same axle torque. The ECM 114 may therefore adjust the target actuator values to enable a faster transition to the predicted torque request 257, while still maintaining the axle torque at the immediate torque request 258.

In various implementations, the predicted torque request 257 may be set based on the driver torque request 254. The immediate torque request 258 may be set to less than the predicted torque request 257 under some circumstances, such as when the driver torque request 254 is causing wheel slip on an icy surface. In such a case, a traction control system (not shown) may request a reduction via the immediate torque request 258, and the ECM 114 reduces the engine torque output to the immediate torque request 258. However, the ECM 114 performs the reduction so the engine system 100 can quickly resume producing the predicted torque request 257 once the wheel slip stops.

In general terms, the difference between the immediate torque request 258 and the (generally higher) predicted torque request 257 can be referred to as a torque reserve. The torque reserve may represent the amount of additional torque (above the immediate torque request 258) that the engine system 100 can begin to produce with minimal delay. Fast engine actuators are used to increase or decrease current axle torque with minimal delay. As described in more detail below, fast engine actuators are defined in contrast with slow engine actuators.

In various implementations, fast engine actuators are capable of varying axle torque within a range, where the range is established by the slow engine actuators. The upper limit of the range is the predicted torque request 257, while the lower limit of the range is limited by the torque (varying) capacity of the fast actuators. For example only, fast actuators may only be able to reduce axle torque by a first amount, where the first amount is a measure of the torque capacity of the fast actuators. The first amount may vary based on engine operating conditions set by the slow engine actuators.

When the immediate torque request 258 is within the range, fast engine actuators can be controlled to cause the axle torque to be equal to the immediate torque request 258. When the ECM 114 requests the predicted torque request 257 to be output, the fast engine actuators can be controlled to vary the axle torque to the top of the range, which is the predicted torque request 257.

In general terms, fast engine actuators can change the axle torque more quickly than slow engine actuators. Slow actuators may respond more slowly to changes in their respective actuator values than fast actuators do. For example, a slow actuator may include mechanical components that require time to move from one position to another in response to a change in actuator value. A slow actuator may also be characterized by the amount of time it takes for the axle torque to begin to change once the slow actuator begins to implement the changed actuator value. Generally, this amount of time will be longer for slow actuators than for fast actuators. In addition, even after beginning to change, the axle torque may take longer to fully respond to a change in a slow actuator.

For example only, the ECM 114 may set actuator values for slow actuators to values that would enable the engine system 100 to produce the predicted torque request 257 if the fast actuators were set to appropriate values. Meanwhile, the ECM 114 may set target actuator values for fast actuators to values that, given the slow actuator values, cause the engine system 100 to produce the immediate torque request 258 instead of the predicted torque request 257.

The fast actuators therefore cause the engine system 100 to produce the immediate torque request 258. When the ECM 114 decides to transition the axle torque from the immediate torque request 258 to the predicted torque request 257, the ECM 114 changes the target actuator values for one or more fast actuators to values that correspond to the predicted torque request 257. Because the target actuator values for the slow actuators have already been set based on the predicted torque request 257, the engine system 100 is able to produce the predicted torque request 257 after only the (minimal) delay imposed by the fast actuators. In other words, the longer delay that would otherwise result from changing axle torque using slow actuators is avoided.

For example only, in a spark-ignition engine, spark timing may be a fast actuator value, while throttle opening may be a slow actuator value. Spark-ignition engines may combust fuels including, for example, gasoline and ethanol, by applying a spark. By contrast, in a compression-ignition engine, fuel flow may be a fast actuator value, while throttle opening may be used as an actuator value for engine characteristics other than torque. Compression-ignition engines may combust fuels including, for example, diesel fuel, via compression.

When the engine 102 is a spark-ignition engine, the spark actuator module 126 may be a fast actuator and the throttle actuator module 116 may be a slow actuator. After receiving a new target actuator value, the spark actuator module 126 may be able to change spark timing for the following firing event. When the spark timing (also called spark advance) for a firing event is set to an optimum value, a maximum amount of torque may be produced in the combustion stroke immediately following the firing event. However, a spark timing deviating from the optimum value may reduce the amount of torque produced in the combustion stroke. Therefore, the spark actuator module 126 may be able to vary engine output torque as soon as the next firing event occurs by varying spark timing. For example only, a table of optimum spark timings corresponding to different engine operating conditions may be determined during a calibration phase of vehicle design, and the optimum value is selected from the table based on current engine operating conditions.

By contrast, changes in throttle opening take longer to affect engine output torque. The throttle actuator module 116 changes the throttle opening by adjusting the angle of the blade of the throttle valve 112. Therefore, once a new actuator value is received, there is a mechanical delay as the throttle valve 112 moves from its previous position to a new position based on the new target actuator value. In addition, air flow changes based on the throttle opening are subject to air transport delays in the intake manifold 110. Further, increased air flow in the intake manifold 110 is not realized as an increase in engine output torque until the cylinder 118 receives additional air in the next intake stroke, compresses the additional air, and commences the combustion stroke.

Using these actuators as an example, a torque reserve can be created by setting the throttle opening to a value that would allow the engine 102 to produce the predicted torque request 257. Meanwhile, the spark timing can be set based on the immediate torque request 258, which is less than the predicted torque request 257. Although the throttle opening generates enough air flow for the engine 102 to produce the predicted torque request 257, the spark timing is retarded (which reduces torque) based on the immediate torque request 258. The engine output torque will therefore be equal to the immediate torque request 258.

When additional torque is needed, the spark timing can be set based on the predicted torque request 257 or a torque between the predicted and immediate torque requests 257 and 258. By the following firing event, the spark actuator module 126 may return the spark timing to an optimum value, which allows the engine 102 to produce the full engine output torque achievable with the air flow already present. The engine output torque may therefore be quickly increased to the predicted torque request 257 without experiencing delays from changing the throttle opening.

The axle torque arbitration module 204 may output the predicted torque request 257 and the immediate torque request 258 to a propulsion torque arbitration module 206. In various implementations, the axle torque arbitration module 204 may output the predicted and immediate torque requests 257 and 258 to the hybrid optimization module 208.

The hybrid optimization module 208 may determine how much torque should be produced by the engine 102 and how much torque should be produced by the electric motor 198. The hybrid optimization module 208 then outputs modified predicted and immediate torque requests 259 and 260, respectively, to the propulsion torque arbitration module 206. In various implementations, the hybrid optimization module 208 may be implemented in the hybrid control module 196.

The predicted and immediate torque requests received by the propulsion torque arbitration module 206 are converted from an axle torque domain (torque at the wheels) into a propulsion torque domain (torque at the crankshaft). This conversion may occur before, after, as part of, or in place of the hybrid optimization module 208.

The propulsion torque arbitration module 206 arbitrates between propulsion torque requests 290, including the converted predicted and immediate torque requests. The propulsion torque arbitration module 206 generates an arbitrated predicted torque request 261 and an arbitrated immediate torque request 262. The arbitrated torque requests 261 and 262 may be generated by selecting a winning request from among received torque requests. Alternatively or additionally, the arbitrated torque requests may be generated by modifying one of the received requests based on another one or more of the received torque requests.

For example, the propulsion torque requests 290 may include torque reductions for engine over-speed protection, torque increases for stall prevention, and torque reductions requested by the transmission control module 194 to accommodate gear shifts. The propulsion torque requests 290 may also result from clutch fuel cutoff, which reduces the engine output torque when the driver depresses the clutch pedal in a manual transmission vehicle to prevent a flare (rapid rise) in engine speed.

The propulsion torque requests 290 may also include an engine shutoff request, which may be initiated when a critical fault is detected. For example only, critical faults may include detection of vehicle theft, a stuck starter motor, electronic throttle control problems, and unexpected torque increases. In various implementations, when an engine shutoff request is present, arbitration selects the engine shutoff request as the winning request. When the engine shutoff request is present, the propulsion torque arbitration module 206 may output zero as the arbitrated predicted and immediate torque requests 261 and 262.

In various implementations, an engine shutoff request may simply shut down the engine 102 separately from the arbitration process. The propulsion torque arbitration module 206 may still receive the engine shutoff request so that, for example, appropriate data can be fed back to other torque requestors. For example, all other torque requestors may be informed that they have lost arbitration.

The reserves/loads module 220 receives the arbitrated predicted and immediate torque requests 261 and 262. The reserves/loads module 220 may adjust the arbitrated predicted and immediate torque requests 261 and 262 to create a torque reserve and/or to compensate for one or more loads. The reserves/loads module 220 then outputs adjusted predicted and immediate torque requests 263 and 264 to the torque requesting module 224.

For example only, a catalyst light-off process or a cold start emissions reduction process may require retarded spark timing. The reserves/loads module 220 may therefore increase the adjusted predicted torque request 263 above the adjusted immediate torque request 264 to create retarded spark for the cold start emissions reduction process. In another example, the air/fuel ratio of the engine and/or the mass air flow may be directly varied, such as by diagnostic intrusive equivalence ratio testing and/or new engine purging. Before beginning these processes, a torque reserve may be created or increased to quickly offset decreases in engine output torque that result from leaning the air/fuel mixture during these processes.

The reserves/loads module 220 may also create or increase a torque reserve in anticipation of a future load, such as power steering pump operation or engagement of an air conditioning (NC) compressor clutch. The reserve for engagement of the NC compressor clutch may be created when the driver first requests air conditioning. The reserves/loads module 220 may increase the adjusted predicted torque request 263 while leaving the adjusted immediate torque request 264 unchanged to produce the torque reserve. Then, when the NC compressor clutch engages, the reserves/loads module 220 may increase the adjusted immediate torque request 264 by the estimated load of the A/C compressor clutch.

The torque requesting module 224 receives the adjusted predicted and immediate torque requests 263 and 264. The torque requesting module 224 determines how the adjusted predicted and immediate torque requests 263 and 264 will be achieved. The torque requesting module 224 may be engine type specific. For example, the torque requesting module 224 may be implemented differently or use different control schemes for spark-ignition engines versus compression-ignition engines.

In various implementations, the torque requesting module 224 may define a boundary between modules that are common across all engine types and modules that are engine type specific. For example, engine types may include spark-ignition and compression-ignition. Modules prior to the torque requesting module 224, such as the propulsion torque arbitration module 206, may be common across engine types, while the torque requesting module 224 and subsequent modules may be engine type specific.

For example, in a spark-ignition engine, the torque requesting module 224 may vary the opening of the throttle valve 112 as a slow actuator that allows for a wide range of torque control. The torque requesting module 224 may disable cylinders using the cylinder actuator module 120, which also provides for a wide range of torque control, but may also be slow and may involve drivability and emissions concerns. The torque requesting module 224 may use spark timing as a fast actuator. However, spark timing may not provide as much range of torque control. In addition, the amount of torque control possible with changes in spark timing (referred to as spark reserve capacity) may vary as air flow changes.

In various implementations, the torque requesting module 224 may generate an air torque request 265 based on the adjusted predicted torque request 263. The air torque request 265 may be equal to the adjusted predicted torque request 263, setting air flow so that the adjusted predicted torque request 263 can be achieved by changes to other (e.g., fast) actuators.

Target actuator values for airflow controlling actuators may be determined based on the air torque request 265. For example only, the air control module 228 (see also FIG. 3) may determine a target manifold absolute pressure (MAP) 266, a target throttle opening (e.g., area) 267, a second target air per cylinder (APC2) 268, and a third target APC (APC3) 291 based on the air torque request 265. Determination of the second and third target APCs 268 and 291 are discussed further below.

The boost control module 248 may determine a target duty cycle 269 for the wastegate 162 based on the target MAP 266. While the target duty cycle 269 will be discussed, the boost control module 248 may determine another suitable value for controlling the wastegate 162. The phaser control module 252 may determine target intake and exhaust cam phaser angles 270 and 271 based on the second target APC 268. The EGR control module 253 determines a target EGR opening 292 based on the third target APC 291.

The torque requesting module 224 may also generate a spark torque request 272, a cylinder shut-off torque request 273, and a fuel torque request 274. The spark control module 232 may determine how much to retard the spark timing (which reduces engine output torque) from an optimum spark timing based on the spark torque request 272. For example only, a torque relationship may be inverted to solve for a desired spark timing 299. For a given torque request ($T_{des}$), the desired spark timing ($S_{des}$) 299 may be determined based on:

$$S_{des}=f^{-1}(T_{des},APC,I,E,AF,OT,\#). \quad (0)$$

This relationship may be embodied as an equation and/or as a lookup table. The air/fuel ratio (AF) may be the actual air/fuel ratio, as reported by the fuel control module 240. The spark control module 232 may also generate a target spark timing 275, as discussed further below in conjunction with FIG. 3.

When the spark timing is set to the optimum spark timing, the resulting torque may be as close to a maximum best torque (MBT) as possible. MBT refers to the maximum engine output torque that is generated for a given air flow as spark timing is advanced, while using fuel having an octane rating greater than a predetermined octane rating and using stoichiometric fueling. The spark timing at which this maximum torque occurs is referred to as an MBT spark timing. The optimum spark timing may differ slightly from MBT spark timing because of, for example, fuel quality (such as when lower octane fuel is used) and environmental factors. The engine output torque at the optimum spark timing may therefore be less than MBT.

The cylinder shut-off torque request 273 may be used by the cylinder control module 236 to determine a target number of cylinders to deactivate 276. The cylinder control module 236 may also instruct the fuel control module 240 to stop providing fuel for deactivated cylinders and may instruct the spark control module 232 to stop providing spark for deactivated cylinders. The spark control module 232 may stop providing spark to a cylinder once an fuel/air mixture that is already present in the cylinder has been combusted.

The fuel control module 240 may vary the amount of fuel provided to each cylinder based on the fuel torque request 274. More specifically, the fuel control module 240 may generate target fueling parameters 277 based on the fuel torque request 274. The target fueling parameters 277 may include, for example, target mass of fuel, target injection starting timing, and target number of fuel injections.

During normal operation of a spark-ignition engine, the fuel control module 240 may operate in an air lead mode in which the fuel control module 240 attempts to maintain a stoichiometric air/fuel ratio by controlling fueling based on air flow. The fuel control module 240 may determine a target fuel mass that will yield stoichiometric combustion when combined with a present mass of air per cylinder (APC).

In compression-ignition systems, the fuel control module 240 may operate in a fuel lead mode in which the fuel control module 240 determines a target fuel mass for each cylinder that satisfies the fuel torque request 274 while minimizing emissions, noise, and fuel consumption. In the fuel lead mode, air flow is controlled based on fuel flow and may be controlled to yield a lean air/fuel ratio. In addition, the air/fuel ratio may be maintained above a predetermined level, which may prevent black smoke production in dynamic engine operating conditions.

The air control module 228 generates the target MAP 266 further based on a MAP estimated torque 278. The MAP estimated torque 278 corresponds to an estimated value of the present engine torque output determined based on a MAP 279 measured using the MAP sensor 184. The MAP torque estimation module 246 generates the MAP estimated torque 278 based on the MAP 279 and other measured engine operating parameters. For example, the MAP torque estimation module 246 generates the MAP estimated torque 278 using the relationship:

$$T_{MAP}=f(MAP,RPM,S_M,I_M,E_M,AF,OT,\#), \quad (1)$$

where $T_{MAP}$ is the MAP estimated torque 278, MAP is the MAP 279, RPM is engine speed (rotational speed of the crankshaft), $S_M$ is present spark timing 280 being used by the spark actuator module 126, $I_M$ is a measured intake cam phaser angle 281, $E_M$ is a measured exhaust cam phaser angle 282, AF is the present air/fuel ratio being used by the fuel actuator module 124, OT is oil temperature, and # is the present number of cylinders that are activated. The relationship may be embodied as an equation or as a look-up table.

The phaser control module 252 may provide the measured intake and exhaust cam phaser angles 281 and 282. The phaser control module 252 may generate the measured intake and exhaust cam phaser angles 281 and 282 based on previous values of the measured intake and exhaust cam phaser angles 281 and 282 and the target intake and exhaust cam phaser angles 270 and 271. For example, the phaser control module 252 may generate the measured intake and exhaust cam phaser angles 281 and 282 using the relationships:

$$I_M=f(I_T)+k^*(I_T-I_{M\_PREV}), \text{ and} \quad (2)$$

$$E_M=f(E_T)+k^*(E_T-E_{M\_PREV}), \quad (3)$$

where $I_M$ is the measured intake cam phaser angle 281, $I_T$ is the target intake cam phaser angle 270, k is a predetermined scalar/gain value, $I_{M\_PREV}$ is a previous value of the measured intake cam phaser angle 281, $E_N$, is the measured exhaust cam phaser angle 282, $E_T$ is the target exhaust cam phaser angle 271, k is a predetermined scalar/gain value, and $E_{M\_PREV}$ is a previous value of the measured exhaust cam phaser angle 282.

The air control module 228 generates various target values further based on a first APC estimated torque 283. The first APC estimated torque 283 corresponds to an estimated value of the present engine torque output determined based on a present APC 284. The present APC 284 is determined based on one or more measured parameters, such as the MAF, the MAP, and/or the IAT. The APC torque estimation module 244 generates the first APC estimated torque 283 based on the present APC 284 and other measured engine operating parameters. The APC torque estimation module 244 generates the first APC estimated torque 283 using the relationship:

$$T_{APC1}=f(APC_M,RPM,S_M,I_M,E_M,AF,OT,\#) \quad (4)$$

where $T_{APC1}$ is the first APC estimated torque 283, $APC_M$ is the present APC 284, RPM is the engine speed, $S_M$ is the present spark timing 280 being used by the spark actuator module 126, $I_M$ is the measured intake cam phaser angle 281, $E_M$ is the measured exhaust cam phaser angle 282, AF is the present air/fuel ratio being used by the fuel actuator module 124, OT is the oil temperature, and # is the present number of cylinders that are activated. The relationship may be embodied as an equation or as a look-up table.

The APC torque estimation module 244 also generates a second APC estimated torque 298 based on the present APC 284 and the target intake and exhaust cam phaser angles 270 and 271. The APC torque estimation module 244 generates the second APC estimated torque 298 using the relationship:

$$T_{APC2}=f(APC_M,RPM,S_M,I_T,E_T,AF,OT,\#), \quad (5)$$

where $T_{APC2}$ is the second APC estimated torque 298, $APC_M$ is the present APC 284, RPM is the engine speed, $S_M$ is the present spark timing 280 being used by the spark actuator module 126, $I_T$ is the target intake cam phaser angle 270, $E_T$ is the target exhaust cam phaser angle 271, AF is the present air/fuel ratio being used by the fuel actuator module 124, OT is the oil temperature, and # is the present number of cylinders that are activated. The relationship may be embodied as an equation or as a look-up table.

The air control module 228 may output the target throttle opening 267 to the throttle actuator module 116. The throttle actuator module 116 regulates the throttle valve 112 to produce the target throttle opening 267. The air control module 228 outputs the target MAP 266 to the boost control module 248. The boost control module 248 controls the wastegate 162 based on the target MAP 266. The air control module 228 outputs the second target APC 268 to the phaser control module 252. Based on the second target APC 268 and the engine speed (and/or crankshaft position), the phaser control module 252 may control positions of the intake and/or exhaust cam phasers 148 and 150.

Figure 3:
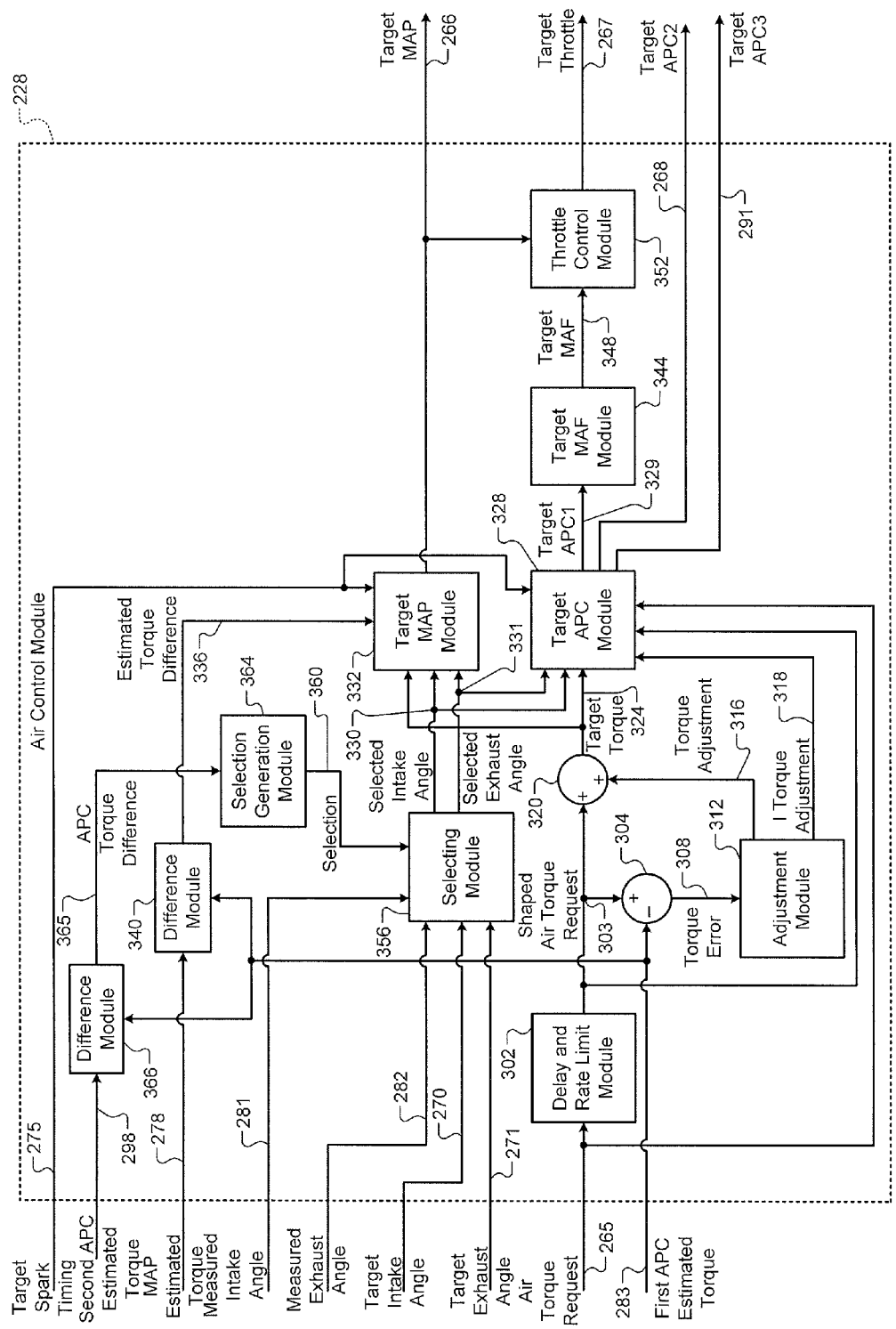
FIG. 3 is a functional block diagram of an example air control module according to the present disclosure.

Referring now to FIG. 3, a functional block diagram of an example implementation of the air control module 228 is presented. A delay and rate limit module 302 applies one or more shaping actions to the air torque request 265 to produce a shaped air torque request 303. More specifically, the delay and rate limit module 302 stores the air torque request 265 for a delay period before outputting the stored air torque request as a delayed air torque request (not shown). The delay and rate limit module 302 may determine the delay period based on an EGR value (e.g., opening or mass flow rate) and/or the engine speed (RPM). The delay and rate limit module 302 applies a rate limit to the delayed air torque request to produce the shaped air torque request 303. In other words, the delay and rate limit module 302 adjusts the shaped air torque request 303 toward the delayed air torque request by up to a maximum amount per predetermined period. The delay and rate limit module 302 may determine the maximum amount based on the EGR value and/or the engine speed. While delaying and rate limiting shaping actions have been described, one or more other shaping actions may also be performed.

A torque error module 304 determines a torque error 308 based on a difference between the shaped air torque request 303 and the first APC estimated torque 283. For example, the torque error module 304 may set the torque error 308 equal to the air torque request 265 minus the first APC estimated torque 283.

An adjustment module 312 generates a torque adjustment 316 based on the torque error 308. The adjustment module 312 may generate the torque adjustment 316, for example, using the relationship:

$$T_{ADJ}=K_P*(T_{ERROR})+K_I*\int T_{ERROR}\partial t, \quad (6)$$

where $T_{ADJ}$ is the torque adjustment 316, $K_P$ is a proportional gain, $T_{ERROR}$ is the torque error 308, and $K_I$ is an integral gain. $K_P*(T_{ERROR})$ will be referred to as a proportional (P) torque adjustment, and $K_I*\int T_{ERROR}\partial t$ at is referred to as an integral (I) torque adjustment 318. The torque adjustment 316 is equal to the sum of the P torque adjustment and the I torque adjustment 318. In various implementations, another suitable type of closed-loop controller may be used to generate the torque adjustment 316 based on the torque error 308.

A target determination module 320 determines a target torque 324 based on the shaped air torque request 303 and the torque adjustment 316. For example, the target determination module 320 may set the target torque 324 equal to the shaped air torque request 303 plus the torque adjustment 316.

Figure 4:
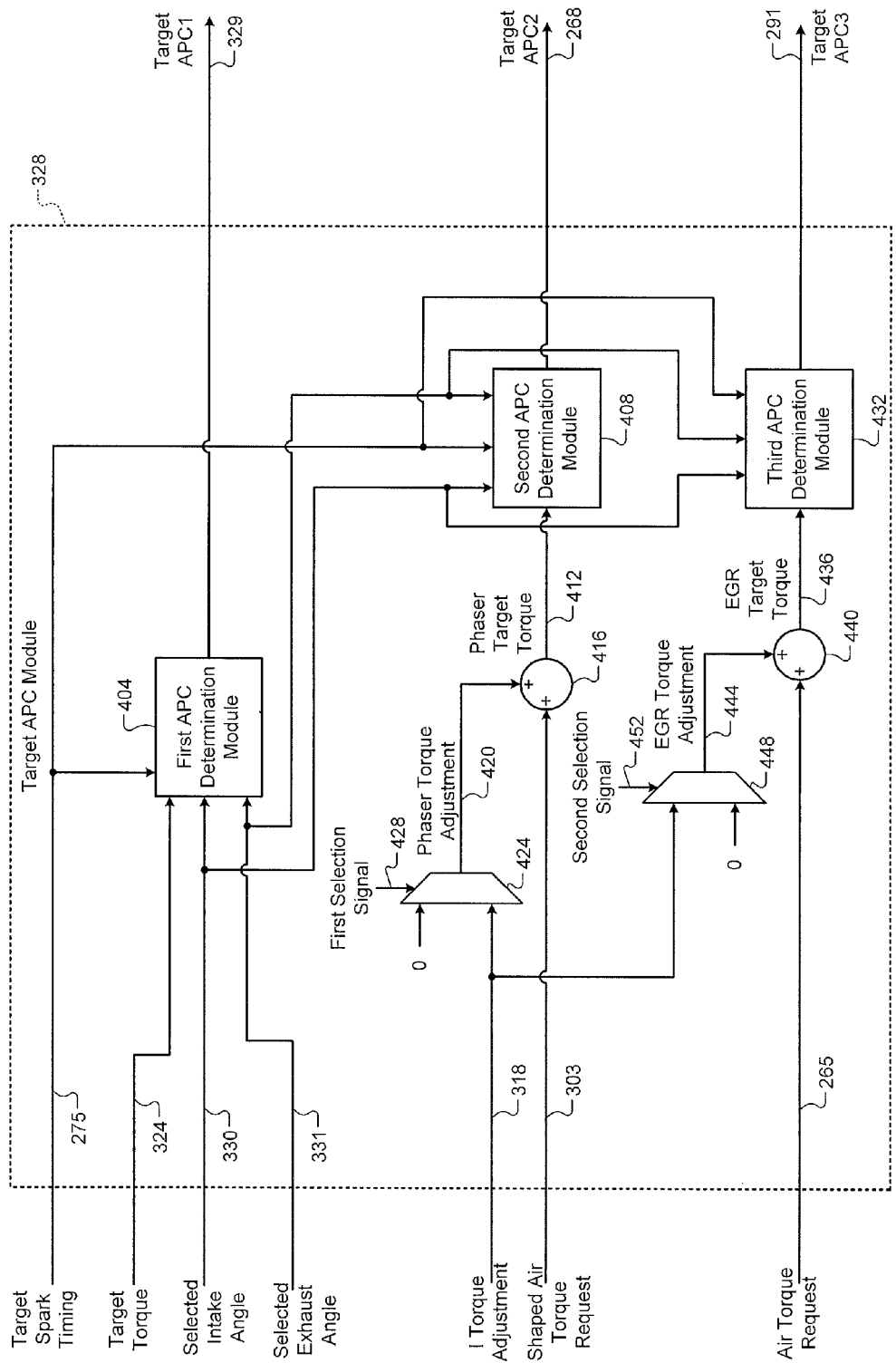
FIG. 4 is a functional block diagram of an example target air per cylinder (APC) module according to the present disclosure.

A target APC module 328 generates a first target APC (APC1) 329. FIG. 4 is a functional block diagram of an example implementation of the target APC module 328. Referring now to FIGS. 3 and 4, a first APC determination module 404 determines the first target APC 329 based on the target torque 324, the target spark timing 275, and selected intake and exhaust cam phaser angles 330 and 331. The first APC determination module 404 determines the first target APC 329 further based on the engine speed, the present air/fuel ratio, the oil temperature, and the present number of active cylinders. Relationship (4) provided above may be inverted and solved to determine the first target APC 329. For example, the first APC determination module 404 may generate the first target APC 329 using the relationship:

$$APC_{T\_1}=T^{-1}(T_T,RPM,S_T,I_{SEL},E_{SEL},AF,OT,\#), \quad (7)$$

where $APC_{T\_1}$ is the first target APC 329, $T_T$ is the target torque 324, RPM is engine speed, $S_T$ is the target spark timing 275, $I_{SEL}$ is the selected intake cam phaser angle 330, $E_{SEL}$ is the selected exhaust cam phaser angle 331, AF is the present air/fuel ratio being used by the fuel actuator module 124, OT is the oil temperature, # is the present number of cylinders that are activated, and $T^{-1}$ denotes inversion of relationship (4) above used to relate the present APC 284 to the first APC estimated torque 283. In various implementations, the target intake and exhaust cam phaser angles 270 and 271 may be used in place of the selected intake and exhaust cam phaser angles 330 and 331. This relationship may be embodied as an equation or as a look-up table. Generation of the selected intake and exhaust cam phaser angles 330 and 331 is discussed further below.

The target APC module 328 also generates the second and third target APCs 268 and 291. A second APC determination module 408 determines the second target APC 268 based on a phaser target torque 412, the target spark timing 275, and selected intake and exhaust cam phaser angles 330 and 331. The second APC determination module 408 determines the second target APC 268 further based on the engine speed, the present air/fuel ratio, the oil temperature, and the present number of active cylinders. Relationship (4) provided above may be inverted and solved to determine the second target APC 268. For example, the second APC determination module 408 may generate the second target APC 268 using the relationship:

$$APC_{T\_2} = T^{-1}(T_{PTT}, RPM, S_T, I_{SEL}, E_{SEL}, AF, OT, \#), \quad (8)$$

where $APC_{T\_2}$ is the second target APC 268, $T_{PTT}$ is the phaser target torque 412, RPM is engine speed, $S_T$ is the target spark timing 275, $I_{SEL}$ is the selected intake cam phaser angle 330, $E_{SEL}$ is the selected exhaust cam phaser angle 331, AF is the present air/fuel ratio being used by the fuel actuator module 124, OT is the oil temperature, # is the present number of cylinders that are activated, and $T^{-1}$ denotes inversion of relationship (4) above used to relate the present APC 284 to the first APC estimated torque 283. In various implementations, the target intake and exhaust cam phaser angles 270 and 271 may be used in place of the selected intake and exhaust cam phaser angles 330 and 331. This relationship may be embodied as an equation or as a look-up table.

A target phaser torque module 416 determines the phaser target torque 412 based on the shaped air torque request 303 and a phaser torque adjustment 420. For example, the target phaser torque module 416 may set the phaser target torque 412 equal to the phaser torque adjustment 420 plus the shaped air torque request 303.

A first selection module 424 sets the phaser torque adjustment 420 to one of zero and the I torque adjustment 318 based on a first selection signal 428. For example, the first selection module 424 may set the phaser torque adjustment 420 to zero when the first selection signal 428 is in a first state and set the phaser torque adjustment 420 to the I torque adjustment 318 when the first selection signal 428 is in a second state. The state of the first selection signal 428 may be set, for example, during the calibration stage of vehicle design. For example, the first selection signal 428 may be set to the first state when the phaser control module 252 can change the target intake and/or exhaust phaser angles 270 and 271 at greater than a predetermined rate. The first selection signal 428 may be set to the second state when the phaser control module 252 is limited to changing the target intake and/or exhaust phaser angles 270 and 271 at less than the predetermined rate.

As stated above, the phaser control module 252 (FIG. 2) generates the target intake and exhaust cam phaser angles 270 and 271 based on the second target APC 268. The phaser control module 252 may determine the target intake and exhaust cam phaser angles 270 and 271 based on the second target APC 268 and the engine speed. For example, the phaser control module 252 may generate the target intake and exhaust cam phaser angles 270 and 271 using the relationships:

$$I_T = f(RPM, APC_{T\_2}); \text{ and} \quad (9)$$

$$E_T = f(RPM, APC_{T\_2}), \quad (10)$$

where $I_T$ is the target intake cam phaser angle 270, RPM is the engine speed, $APC_{T\_2}$ is the second target APC 268, and $E_T$ is the target exhaust cam phaser angle 271. These relationships may be embodied as equations or as look-up tables. The phaser actuator module 158 controls the intake and exhaust cam phasers 148 and 150 based on the target intake and exhaust cam phaser angles 270 and 271, respectively.

A third APC determination module 432 determines the third target APC 291 based on an EGR target torque 436, the target spark timing 275, and selected intake and exhaust cam phaser angles 330 and 331. The third APC determination module 432 determines the third target APC 291 further based on the engine speed, the present air/fuel ratio, the oil temperature, and the present number of active cylinders. Relationship (4) provided above may be inverted and solved to determine the third target APC 291. For example, the third APC determination module 432 may generate the third target APC 291 using the relationship:

$$APC_{T\_3} = T^{-1}(T_{EGRT}, RPM, S_T, I_{SEL}, E_{SEL}, AF, OT, \#) \quad (11)$$

where $APC_{T\_3}$ is the third target APC 291, $T_{EGRT}$ is the EGR target torque 436, RPM is engine speed, $S_T$ is the target spark timing 275, $I_{SEL}$ is the selected intake cam phaser angle 330, $E_{SEL}$ is the selected exhaust cam phaser angle 331, AF is the present air/fuel ratio being used by the fuel actuator module 124, OT is the oil temperature, # is the present number of cylinders that are activated, and $T^{-1}$ denotes inversion of relationship (4) above used to relate the present APC 284 to the first APC estimated torque 283. In various implementations, the target intake and exhaust cam phaser angles 270 and 271 may be used in place of the selected intake and exhaust cam phaser angles 330 and 331. This relationship may be embodied as an equation or as a look-up table.

A target EGR torque module 440 determines the EGR target torque 436 based on the air torque request 265 and an EGR torque adjustment 444. For example, the target EGR torque module 440 may set the EGR target torque 436 equal to the EGR torque adjustment 444 plus the air torque request 265.

A second selection module 448 sets the EGR torque adjustment 444 to one of zero and the I torque adjustment 318 based on a second selection signal 452. For example, the second selection module 448 may set the EGR torque adjustment 444 to zero when the second selection signal 452 is in a first state and set the EGR torque adjustment 444 to the I torque adjustment 318 when the second selection signal 452 is in a second state. The state of the second selection signal 452 may be set, for example, during the calibration stage of vehicle design. For example, the second selection signal 452 may be set to the first state when the EGR control module 253 can change the target EGR opening 292 at greater than a predetermined rate. The second selection signal 452 may be set to the second state when the EGR control module 253 is limited to changing the target EGR opening 292 at less than the predetermined rate.

As stated above, the EGR control module 253 (FIG. 2) generates the target EGR opening 292 based on the third target APC 291. The EGR control module 253 may determine a target EGR mass flow rate based on the third target APC 291 and the engine speed. The EGR control module 253 may generate the target EGR mass flow rate, for example, using the relationship:

$$M_{EGRT} = f(RPM, APC_{T\_3}) \quad (12)$$

where $M_{EGRT}$ is the mass EGR flow rate, RPM is the engine speed, and $APC_{T\_3}$ is the third target APC 291. This relationship may be embodied as an equation or as a look-up table.

The EGR control module 253 may determine the target EGR opening 292 based on the target EGR mass flow rate. The EGR control module 253 determines the target EGR opening 292 further based on the target MAP 266, an exhaust temperature, and an exhaust pressure. For example, the EGR control module 253 may determine the target EGR opening 292 using the relationship:

$$\text{AREA}_{EGRT} = \frac{M_{EGRT} * \sqrt{R_{GAS} * T_{exh}}}{P_{exh} * \Phi\left(\frac{MAP_T}{P_{exh}}\right)}, \quad (13)$$

where $\text{AREA}_{EGRT}$ is the target EGR opening 292, $M_{EGRT}$ is the target EGR mass flow rate, $MAP_T$ is the target MAP 266, $R_{GAS}$ is the ideal gas constant, $T_{exh}$ is an exhaust temperature, $P_{exh}$ is an exhaust pressure, and ϕ represents an air density function. As stated above, the EGR actuator module 172 controls the EGR valve 170 based on the target EGR opening 292.

Referring back to FIG. 3, a target MAP module 332 generates the target MAP 266 based on the target torque 324, the target spark timing 275, and the selected intake and exhaust cam phaser angles 330 and 331. The target MAP module 332 generates the target MAP 266 further based on the engine speed, the present air/fuel ratio, the oil temperature, the present number of active cylinders, and an estimated torque difference 336. Relationship (1) provided above may be inverted and solved to determine the target MAP 266. For example, the target MAP module 332 may generate the target MAP 266 using the relationship:

$$MAP_T = T^{-1}((T_T + f(T_{EST\_DIFF})), RPM, S_T, I_{SEL}, E_{SEL}, AF, OT, \#) \quad (14)$$

where $MAP_T$ is the target MAP 266, $T_T$ is the target torque 324, $T_{EST\_DIFF}$ is the estimated torque difference 336, RPM is the engine speed, $S_T$ is the target spark timing 275, $I_{SEL}$ is the selected intake cam phaser angle 330, $E_{SEL}$ is the selected exhaust cam phaser angle 331, AF is the present air/fuel ratio being used by the fuel actuator module 124, OT is the oil temperature, # is the present number of cylinders that are activated, and $T^{-1}$ denotes inversion of relationship (1) above used to relate the MAP 279 to the MAP estimated torque 278. In various implementations, the target intake and exhaust cam phaser angles 270 and 271 may be used in place of the selected intake and exhaust cam phaser angles 330 and 331. This relationship may be embodied as an equation or as a look-up table. As noted above, generation of the selected intake and exhaust cam phaser angles 330 and 331 is discussed further below.

A difference module 340 determines the estimated torque difference 336. The difference module 340 determines the estimated torque difference 336 based on a difference between the MAP estimated torque 278 and the first APC estimated torque 283. The difference module 340 may also apply a filter to the difference between the MAP estimated torque 278 and the first APC estimated torque 283, such as a low pass filter, and output the filtered difference as the estimated torque difference 336.

As stated above, the boost control module 248 may generate the target duty cycle 269 based on the target MAP 266. The boost actuator module 164 controls the wastegate 162 (and therefore the turbocharger) based on the target duty cycle 269.

A target MAF module 344 generates a target MAF 348 into the engine 102 based on the first target APC 329. The target MAF module 344 generates the target MAF 348 further based on the engine speed and the total number of cylinders of the engine 102. For example, the target MAF module 344 may generate the target MAF 348 using the relationship:

$$MAF_T = \frac{APC_{T\_1} * RPM}{k_{CYL}}, \quad (15)$$

where $MAF_T$ is the target MAF 348, $APC_{T\_1}$ is the first target APC 329, RPM is the engine speed, and $k_{CYL}$ is a predetermined value set based on the total number of cylinders of the engine 102. For example only, $k_{CYL}$ may be approximately 15 for an 8-cylinder engine and approximately 30 for a 4-cylinder engine.

A throttle control module 352 determines the target throttle opening 267 for the throttle valve 112 based on the target MAF 348. The throttle control module 352 determines the target throttle opening 267 further based on the target MAP 266, an air temperature, and a barometric pressure. For example, the throttle control module 352 may determine the target throttle opening 267 using the relationship:

$$\text{AREA}_T = \frac{MAF_T * \sqrt{R_{GAS} * T}}{B * \Phi\left(\frac{MAP_T}{B}\right)}, \quad (16)$$

where $\text{AREA}_T$ is the target throttle opening 267, $MAF_T$ is the target MAF 348, $MAP_T$ is the target MAP 266, $R_{GAS}$ is the ideal gas constant, T is the air temperature (e.g., ambient or intake), B is the barometric pressure, and ϕ represents an air density function. As stated above, the throttle actuator module 116 controls the throttle valve 112 based on the target throttle opening 267.

In sum, the throttle valve 112 and the turbocharger (if present) are controlled based on the target torque 324, which is generated based on the shaped air torque request 303 and the torque adjustment 316. The intake and exhaust cam phasers 148 and 150, however, are controlled based on the phaser target torque 412, which is generated based on the shaped air torque request 303 and the phaser target torque 412. Additionally, the EGR valve 170 will be controlled based on the air torque request 265 and the EGR target torque 436. This ensures that generation of the target torque 324, the phaser target torque 412, and the EGR target torque 436 is coordinated with the response characteristics of the throttle valve 112 and the turbocharger, the intake and exhaust cam phasers 148 and 150, and the EGR valve 170, respectively. This coordination may provide a steady-state and transient performance improvement.

Referring back to the target spark timing 275, the torque relationship (4) provided above may be inverted to solve for a spark APC (not shown). For example, the spark control module 232 may determine the spark APC using the relationship:

$$APC_{SPARK} = T^{-1}(T_{SPARK}, RPM, S_M, I_T, E_T, AF, OT, \#) \quad (17)$$

where $APC_{SPARK}$ is the spark APC, $T_{SPARK}$ is the spark torque request 272, RPM is the engine speed, $S_M$ is the present spark timing 280 being used by the spark actuator module 126, $I_T$ is the target intake cam phaser angle 270, $E_T$ is the target exhaust cam phaser angle 271, AF is the present air/fuel ratio being used by the fuel actuator module 124, OT is the oil temperature, # is the present number of cylinders that are activated, and $T^{-1}$ denotes inversion of relationship (4) above used to relate the present APC 284 to the first APC estimated torque 283. This relationship may be embodied as an equation or as a look-up table.

The spark control module 232 determines the target spark timing 275 based on the spark APC and the engine speed. For example, the spark control module 232 may determine the target spark timing 275 using the relationship:

$$S_T = f(APC_{SPARK}, RPM), \quad (18)$$

where $S_T$ is the target spark timing 275, $APC_{SPARK}$ is the spark APC, and RPM is the engine speed.

A selecting module 356 sets the selected intake and exhaust cam phaser angles 330 and 331 based on either the measured intake and exhaust cam phaser angles 281 and 282 or the target intake and exhaust cam phaser angles 270 and 271, respectively. More specifically, the selecting module 356 sets the selected intake cam phaser angle 330 based on either the measured intake cam phaser angle 281 or the target intake cam phaser angle 270 and sets the selected exhaust cam phaser angle 331 based on either the measured exhaust cam phaser angle 282 or the target exhaust cam phaser angle 271.

A selection signal 360 controls whether the selecting module 356 sets the selected intake and exhaust cam phaser angles 330 and 331 based on the measured intake and exhaust cam phaser angles 281 and 282 or based on the target intake and exhaust cam phaser angles 270 and 271. For example, the selecting module 356 may set the selected intake and exhaust cam phaser angles 330 and 331 based on the target intake and exhaust cam phaser angles 270 and 271 when the selection signal 360 is in a first state. When the selection signal 360 is in a second state, the selecting module 356 may set the selected intake and exhaust cam phaser angles 330 and 331 based on the measured intake and exhaust cam phaser angles 281 and 282.

When the selection signal 360 transitions from the first state to the second state or vice versa, the selecting module 356 may rate limit changes in the selected intake and exhaust cam phaser angles 330 and 331. For example, when the selection signal 360 transitions from the first state to the second state, the selecting module 356 may adjust the selected intake and exhaust cam phaser angles 330 and 331 toward the measured intake and exhaust cam phaser angles 281 and 282 by up to a first predetermined amount every predetermined period. When the selection signal 360 transitions from the second state to the first state, the selecting module 356 may adjust the selected intake and exhaust cam phaser angles 330 and 331 toward the target intake and exhaust cam phaser angles 270 and 271 by up to a second predetermined amount every predetermined period. The first and second predetermined amounts may be the same or different.

A selection generation module 364 generates the selection signal 360. The selection generation module 364 sums an APC torque difference 365 over a predetermined period (or a predetermined number of samples) to determine a cumulative difference. A second difference module 366 determines the APC torque difference 365. The second difference module 366 determines the APC torque difference 365 based on a difference between the first APC estimated torque 283 and the second APC estimated torque 298. The second difference module 366 may also apply a filter to the difference between the first APC estimated torque 283 and the second APC estimated torque 298, such as a low pass filter, and output the filtered difference as the APC torque difference 365.

The selection generation module 364 generates the selection signal 360 based on the cumulative difference. More specifically, the selection generation module 364 sets the selection signal 360 to the first state when the cumulative difference is less than a predetermined value. When the cumulative difference is greater than the predetermined value, the selection generation module 364 may set the selection signal 360 to the second state. In this manner the selecting module 356 sets the selected intake and exhaust cam phaser angles 330 and 331 based on the target intake and exhaust cam phaser angles 270 and 271 when the cumulative difference is less than the predetermined value. When the cumulative difference is greater than the predetermined value, the selecting module 356 may set the selected intake and exhaust cam phaser angles 330 and 331 based on the measured intake and exhaust cam phaser angles 281 and 282. This may ensure that use of the target intake and exhaust cam phaser angles 270 and 271 is limited to times when the target intake and exhaust cam phaser angles 270 and 271 are accurate, as indicated by the cumulative difference being less than the predetermined value.

Figure 5:
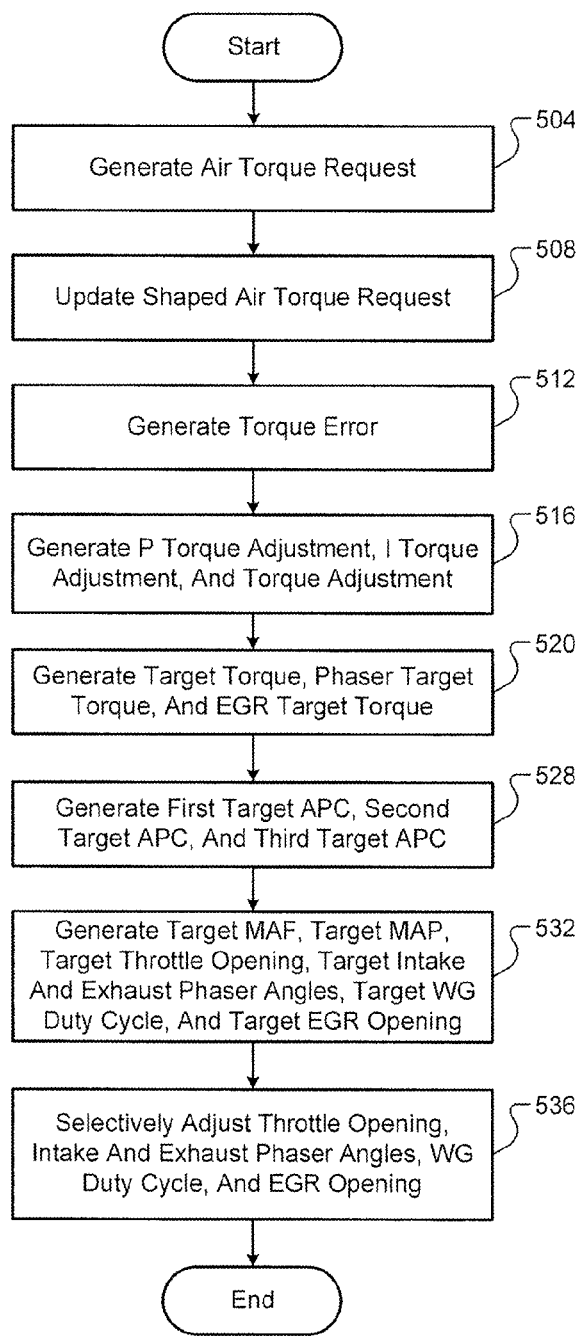
FIG. 5 includes a flowchart depicting an example method of controlling a throttle valve, intake and exhaust valve phasing, a wastegate, and an exhaust gas recirculation (EGR) valve, according to the present disclosure.

Referring now to FIG. 5, a flowchart depicting an example method of controlling the throttle valve 112, the intake and exhaust cam phasers 148 and 150, the wastegate 162, and the EGR valve 170, is presented. Control may begin with 504 where the torque requesting module 224 generates the air torque request 265. The delay and rate limit module 302 updates the shaped air torque request 303 at 508. The delay and rate limit module 302 receives the air torque request 265 and stores the air torque request 265 for the delay period. The delay and rate limit module 302 adjusts the shaped air torque request 303 toward a stored air torque request by up to the predetermined amount. The delay period and the predetermined amount may be determined based on the EGR value and/or the engine speed.

The torque error module 304 generates the torque error 308 at 512. The torque error module 304 determines the torque error 308 based on a difference between the shaped air torque request 303 and the first APC estimated torque 283. The adjustment module 312 determines the P torque adjustment, the I torque adjustment 318, and the torque adjustment 316 at 516 based on the torque error 308. As discussed above in conjunction with (6), the adjustment module 312 may determine the P torque adjustment based on a product of the proportional gain ($K_P$) and the torque error 308 and determine the I torque adjustment 318 based on a product of the torque error 308 and an integral gain ($K_I$). The adjustment module 312 may set the torque adjustment 316 equal to the I torque adjustment 318 plus the P torque adjustment.

At 520, the target determination module 320 generates the target torque 324, the target phaser torque module 416 generates the phaser target torque 412, and the target EGR torque module 440 generates the EGR target torque 436. The target determination module 320 determines the target torque 324 based on the torque adjustment 316 and the shaped air torque request 303, as discussed above. The target phaser torque module 416 determines the phaser target torque 412 based on the shaped air torque request 303 and the phaser torque adjustment 420, as discussed above. The target EGR torque module 440 determines the EGR torque target 436 based on the air torque request 265 and the EGR torque adjustment 444, as described above.

At 528, the first APC determination module 404 determines the first target APC 329, the second APC determination module 408 determines the second target APC 268, and the third APC determination module 432 determines the third target APC 291. The first APC determination module 404 determines the first target APC 329 based on the target torque 324, as discussed above. The second APC determination module 408 determines the second target APC 268 based on the phaser target torque 412, as discussed above. The third APC determination module 432 determines the third target APC 291 based on the EGR target torque 436, as described above.

At 532, the target MAF module 344 generates the target MAF 348, the throttle control module 352 generates the target throttle opening 267, and the target MAP module 332 generates the target MAP 266. The target MAF module 344 determines the target MAF 348 based on the first target APC 329, as discussed above. The throttle control module 352 determines the target throttle opening 267 based on the target MAF 348, as discussed above. The target MAP module 332 determines the target MAP 266 based on the target torque 324, as discussed above.

Also at 532, the boost control module 248 generates the target duty cycle 269, the phaser control module 252 generates the target intake and exhaust cam phaser angles 270 and 271, and the EGR control module 253 generates the target EGR opening 292. The boost control module 248 determines the target duty cycle 269 based on the target MAP 266, as discussed above. The phaser control module 252 determines the target intake and exhaust cam phaser angles 270 and 271 based on the second target APC 268, as discussed above. The EGR control module 253 determines the target EGR opening 292 based on the third target APC 291, as discussed above.

At 536, the throttle actuator module 116 selectively adjusts the throttle valve 112 based on the target throttle opening 267, and the boost actuator module 164 selectively adjusts the duty cycle applied to the wastegate 162 based on the target duty cycle 269. Also at 536, the phaser actuator module 158 selectively adjusts the intake and exhaust cam phasers 148 and 150 based on the target intake and exhaust cam phaser angles 270 and 271, and the EGR actuator module 172 selectively adjusts the EGR valve 170 based on the target EGR opening 292. Control may then end. While control is shown and discussed as ending, FIG. 5 may be illustrative of one control loop, and control loops may be executed at a predetermined rate.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); a discrete circuit; an integrated circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be partially or fully implemented by one or more computer programs executed by one or more processors. The computer programs include processor-executable instructions that are stored on at least one non-transitory tangible computer readable medium. The computer programs may also include and/or rely on stored data. Non-limiting examples of the non-transitory tangible computer readable medium include nonvolatile memory, volatile memory, magnetic storage, and optical storage.

What is claimed is:

1. An engine control system for a vehicle, comprising:
a delay and rate limit module that determines a delay period based on an engine speed and an exhaust gas recirculation (EGR) value, that stores a first torque request for the delay period to produce a delayed torque request, that determines a rate limit based on the engine speed and the EGR value, and that applies the rate limit to the delayed torque request to produce a second torque request;
a throttle control module that determines a target throttle opening based on the second torque request and that, via a throttle actuator module, selectively adjusts a throttle valve based on the target throttle opening;
a phaser control module that determines target intake and exhaust phasing values based on the second torque request and that, via a phaser actuator module, selectively adjusts intake and exhaust valve phasers based on the target intake and exhaust phasing values, respectively; and
an EGR control module that determines a target EGR opening based on the first torque request and that, via an EGR actuator module, selectively adjusts an EGR valve based on the target EGR opening.

2. The engine control system of claim 1 further comprising an adjustment module that determines a first torque adjustment based on a product of a first predetermined value and a difference between the second torque request and an estimated torque output of an engine, that determines a second torque adjustment based on an integral of a product of a second predetermined value and the difference, and that determines a third torque adjustment based on the first and second torque adjustments, wherein:
the throttle control module determines the target throttle opening further based on the third torque adjustment;
the phaser control module determines the target intake and exhaust phasing values further based on the second torque adjustment; and
the EGR control module determines the target EGR opening further based on the second torque adjustment.

3. The engine control system of claim 2 wherein the throttle control module determines the target throttle opening based on a sum of the second torque request and the third torque adjustment.

4. The engine control system of claim 2 wherein the phaser control module determines the target intake and exhaust phasing values based on a sum of the second torque request and the second torque adjustment.

5. The engine control system of claim 2 wherein the EGR control module determines the target EGR opening based on a sum of the first torque request and the second torque adjustment.

6. The engine control system of claim 2 further comprising:
a first air per cylinder (APC) determination module that determines a first amount of air per cylinder based on the second torque request and the third torque adjustment;
a second APC determination module that determines a second amount of air per cylinder based on the second torque request and the second torque adjustment; and
a third APC determination module that determines a third amount of air per cylinder based on the first torque request and the second torque adjustment,
wherein:
the throttle control module determines the target throttle opening based on the first amount of air per cylinder;
the phaser control module determines the target intake and exhaust phasing values based on the second amount of air per cylinder; and
the EGR control module determines the target EGR opening based on the third amount of air per cylinder.

7. The engine control system of claim 6 wherein:
the first APC determination module determines the first amount of air per cylinder based on a sum of the second torque request and the third torque adjustment;
the second APC determination module determines the second amount of air per cylinder based on a sum of the second torque request and the second torque adjustment; and
the third APC determination module determines the third amount of air per cylinder based on a sum of the first torque request and the second torque adjustment.

8. The engine control system of claim 2 further comprising a boost control module that determines a target wastegate value based on the second torque request and the third torque adjustment and that, via a boost actuator module, selectively adjusts a wastegate of a turbocharger based on the target wastegate value.

9. The engine control system of claim 2 wherein the adjustment module determines the third torque adjustment based on a sum of the first and second torque adjustments.

10. An engine control method for a vehicle, comprising:
determining a delay period based on an engine speed and an exhaust gas recirculation (EGR) value;
storing a first torque request for the delay period to produce a delayed torque request;
determining a rate limit based on the engine speed and the EGR value;
applying the rate limit to the delayed torque request to produce a second torque request;
determining a target throttle opening based on the second torque request;
selectively adjusting a throttle valve based on the target throttle opening;
determining target intake and exhaust phasing values based on the second torque request;
selectively adjusting intake and exhaust valve phasers based on the target intake and exhaust phasing values, respectively;
determining a target EGR opening based on the first torque request; and
selectively adjusting an EGR valve based on the target EGR opening.

11. The engine control method of claim 10 further comprising:
determining a first torque adjustment based on a product of a first predetermined value and a difference between the second torque request and an estimated torque output of an engine;
determining a second torque adjustment based on an integral of a product of a second predetermined value and the difference;
determining a third torque adjustment based on the first and second torque adjustments;
determining the target throttle opening further based on the third torque adjustment;
determining the target intake and exhaust phasing values further based on the second torque adjustment; and
determining the target EGR opening further based on the second torque adjustment.

12. The engine control method of claim 11 further comprising determining the target throttle opening based on a sum of the second torque request and the third torque adjustment.

13. The engine control method of claim 11 further comprising determining the target intake and exhaust phasing values based on a sum of the second torque request and the second torque adjustment.

14. The engine control method of claim 11 further comprising determining the target EGR opening based on a sum of the first torque request and the second torque adjustment.

15. The engine control method of claim 11 further comprising:
determining a first amount of air per cylinder based on the second torque request and the third torque adjustment;
determining a second amount of air per cylinder based on the second torque request and the second torque adjustment;
determining a third amount of air per cylinder based on the first torque request and the second torque adjustment;
determining the target throttle opening based on the first amount of air per cylinder;
determining the target intake and exhaust phasing values based on the second amount of air per cylinder; and
determining the target EGR opening based on the third amount of air per cylinder.

16. The engine control method of claim 15 further comprising:
determining the first amount of air per cylinder based on a sum of the second torque request and the third torque adjustment;
determining the second amount of air per cylinder based on a sum of the second torque request and the second torque adjustment; and
determining the third amount of air per cylinder based on a sum of the first torque request and the second torque adjustment.

17. The engine control method of claim 11 further comprising:
determining a target wastegate value based on the second torque request and the third torque adjustment; and
selectively adjusting a wastegate of a turbocharger based on the target wastegate value.

18. The engine control method of claim 11 further comprising determining the third torque adjustment based on a sum of the first and second torque adjustments.

\* \* \* \* \*